United States Patent
Matsuoka

(10) Patent No.: US 11,362,477 B2
(45) Date of Patent: Jun. 14, 2022

(54) FIBER LASER SYSTEM AND CONTROL METHOD THEREFOR

(71) Applicant: FUJIKURA LTD., Tokyo (JP)

(72) Inventor: Yuji Matsuoka, Chiba (JP)

(73) Assignee: FUJIKURA LTD., Tokyo (JP)

( * ) Notice: Subject to any disclaimer, the term of this patent is extended or adjusted under 35 U.S.C. 154(b) by 311 days.

(21) Appl. No.: 16/651,646

(22) PCT Filed: Sep. 29, 2017

(86) PCT No.: PCT/JP2017/035468
§ 371 (c)(1),
(2) Date: Jun. 26, 2020

(87) PCT Pub. No.: WO2019/064489
PCT Pub. Date: Apr. 4, 2019

(65) Prior Publication Data
US 2021/0021092 A1 Jan. 21, 2021

(51) Int. Cl.
*H01S 3/067* (2006.01)
*B23K 26/064* (2014.01)
(Continued)

(52) U.S. Cl.
CPC .......... *H01S 3/0675* (2013.01); *B23K 26/064* (2015.10); *H01S 3/1022* (2013.01);
(Continued)

(58) Field of Classification Search
CPC ....... H01S 3/1022–1024; H01S 3/1312; H01S 3/13013; H01S 3/1001;
(Continued)

(56) References Cited

U.S. PATENT DOCUMENTS 6,728,028 B1 * 4/2004 Rodriguez .......... H01S 3/06758
359/341.32
10,456,860 B2 * 10/2019 Kyoto ................ H01S 5/06216
(Continued)

FOREIGN PATENT DOCUMENTS

CN 101456298 A 6/2009
CN 103260811 A 8/2013
(Continued)

OTHER PUBLICATIONS

International Preliminary Report on Patentability issued in corresponding International Application No. PCT/JP2017/035468, dated Mar. 31, 2020, with translation (9 pages).
(Continued)

*Primary Examiner* — Joshua King
(74) *Attorney, Agent, or Firm* — Osha Bergman Watanabe & Burton LLP

(57) ABSTRACT

A fiber laser system, includes: N fiber laser units that generates respective laser beams, where N≥2; an output combiner that: combines the respective laser beams, and generates output light including, as the respective laser beams, laser beams different from each other in terms of NA power cumulative distribution; and a control unit that sets a power of each of the respective laser beams such that an upper limit NA corresponding to each of not more than (N−1) predetermined power cumulative rate(s) is equal to a specified value for the output light.

4 Claims, 4 Drawing Sheets

(51) Int. Cl.
*H01S 3/102* (2006.01)
*H01S 3/23* (2006.01)
*H01S 3/094* (2006.01)
*H01S 3/0941* (2006.01)

(52) U.S. Cl.
CPC ........ *H01S 3/2383* (2013.01); *H01S 3/09415* (2013.01); *H01S 3/094053* (2013.01)

(58) Field of Classification Search
CPC .............................. H01S 3/2383–2391; H01S 3/094003–094023; H01S 3/094049–094057; H01S 3/23–2391
See application file for complete search history.

(56) References Cited

U.S. PATENT DOCUMENTS

| | | |
|---|---|---|
| 2010/0189138 A1 | 7/2010 | Shkurikhin et al. |
| 2011/0085230 A1* | 4/2011 | Rapp ................. H04B 10/2931 359/341.3 |
| 2013/0032581 A1* | 2/2013 | Kusukame ......... B23K 26/0622 219/121.6 |
| 2014/0036938 A1* | 2/2014 | Nakai ................... H01S 5/0064 372/6 |
| 2014/0139908 A1* | 5/2014 | Liu .................. H01S 3/094061 359/341.3 |
| 2014/0205236 A1* | 7/2014 | Noguchi .............. G02B 6/2835 385/33 |
| 2015/0229095 A1* | 8/2015 | Miyato ................. H01S 3/0941 372/6 |
| 2015/0241632 A1 | 8/2015 | Chann et al. |
| 2015/0372442 A1* | 12/2015 | Dong .................. H01S 3/06708 372/6 |
| 2015/0375337 A1 | 12/2015 | Hayashi |
| 2016/0211639 A1* | 7/2016 | Holland ............ H01S 3/094019 |
| 2016/0218476 A1* | 7/2016 | Kliner ................ H01S 3/08045 |
| 2017/0125976 A1 | 5/2017 | Sato |
| 2017/0179672 A1* | 6/2017 | Kashiwagi ......... B23K 26/0613 |
| 2017/0271837 A1* | 9/2017 | Hemenway .......... G02B 27/141 |

FOREIGN PATENT DOCUMENTS

| | | | |
|---|---|---|---|
| CN | 104037616 A | 9/2014 | |
| CN | 106062600 A | 10/2016 | |
| CN | 106605160 A | 4/2017 | |
| CN | 107005017 A | 8/2017 | |
| DE | 102010045184 A1 * | 3/2012 | ....... H01S 3/094053 |
| JP | 2009178720 A | 8/2009 | |
| JP | 2012091217 A | 5/2012 | |
| JP | 2015022133 A | 2/2015 | |
| JP | 2017026660 A | 2/2017 | |
| JP | 2017028185 A | 2/2017 | |
| WO | 2012030892 A2 | 3/2012 | |
| WO | 2012036664 A1 | 3/2012 | |
| WO | 2013019204 A1 | 2/2013 | |
| WO | WO-2015002004 A1 * | 1/2015 | ........ B23K 26/0604 |
| WO | 2015130920 A1 | 9/2015 | |

OTHER PUBLICATIONS

International Search Report issued in corresponding International Application No. PCT/JP2017/035468, dated Nov. 28, 2017 (1 page).

* cited by examiner

FIBER LASER SYSTEM AND CONTROL METHOD THEREFOR

TECHNICAL FIELD

The present invention relates to a fiber laser system including a plurality of fiber laser units. The present invention also relates to a method for controlling such a fiber laser system.

BACKGROUND

A fiber laser system including a plurality of fiber laser units has been in use as a processing laser device. Such a fiber laser system may be capable of changing the angle of divergence of output light in correspondence with, for example, the type of processing and/or shape of a processing target object. For instance, cutting a processing target object requires output light having a relatively small divergence angle, whereas welding a processing target object requires output light having a relatively large divergence angle. In a case where a fiber laser system is capable of changing the angle of divergence of output light, that fiber laser system can be used to both cut and weld a processing target object.

Patent Literature 1 discloses a fiber laser device capable of changing the angle of divergence of output light. The fiber laser device disclosed in Patent Literature 1 changes the angle of divergence of output light with use of a spatial optical system inserted between an amplifying fiber and a delivery fiber.

The issues below are unfortunately involved with a fiber laser device that changes the angle of divergence of output light with use of a spatial optical system as the fiber laser device disclosed in Patent Literature 1.

First, maintaining an intended performance requires periodical alignment of the spatial optical system. Second, the spatial optical system occupies a large space, making it difficult to downsize the device.

One or more embodiments of the present invention provide a fiber laser system capable of changing the angle of divergence of output light without use of a spatial optical system.

PATENT LITERATURE

Patent Literature 1

Japanese Patent Application Publication, Tokukai, No. 2009-178720 (Publication Date: Aug. 13, 2009)

SUMMARY

A fiber laser system in accordance with one or more embodiments of the present invention includes: N fiber laser units, where N≥2, configured to generate respective laser beams; an output combiner configured to (i) combine the respective laser beams from the N fiber laser units and (ii) generate output light including, as the respective laser beams from the N fiber laser units, laser beams different from each other in terms of NA power cumulative distribution; and a control unit configured to set a power of each of the respective laser beams from the N fiber laser units so that an upper limit NA corresponding to each of not more than (N−1) predetermined power cumulative rate(s) is equal to a specified value for the output light.

A control method in accordance with one or more embodiments of the present invention is a method for controlling a fiber laser system including: N fiber laser units, where N≥2, configured to generate respective laser beams; and an output combiner configured to (i) combine the respective laser beams from the N fiber laser units and (ii) generate output light including, as the respective laser beams from the N fiber laser units, laser beams different from each other in terms of NA power cumulative distribution, the method including the step of: setting a power of each of the respective laser beams from the N fiber laser units so that an upper limit NA corresponding to each of not more than (N−1) predetermined power cumulative rate(s) is equal to a specified value for the output light.

The present invention provides a fiber laser system capable of changing the NA power cumulative distribution of output light without use of a spatial optical system. In other words, the present invention provides a fiber laser system capable of changing the power cumulative distribution of the angle of divergence of output light without use of a spatial optical system.

DETAILED DESCRIPTION

Definitions of Terms

NA of light guided through the core of an optical fiber refers to an amount defined by NA=n sin θ, where n represents the refractive index of the core, and θ represents the angle of propagation of the light. In a case where light guided through the core of an optical fiber enters a medium (for example, air) having a refractive index n', measuring the angle θ' of divergence of light in the medium allows NA of the light guided through the core of the optical fiber to be evaluated by NA=n' sin θ' (=n sin θ).

Light guided through the core of an optical fiber includes light components having respective NA values different from each other. Setting an upper limit value NAmax for NA allows a power cumulative rate x=P(NAmax)/Ptotal[%] to be set, where Ptotal represents the power of the light guided through the core of the optical fiber, and P(NAmax) represents the power of a light component included in the light guided through the core of the optical fiber which light component has an NA value not larger than the upper limit value NAmax. The power cumulative rate x can thus be regarded as being a function x(NAmax) of the upper limit value NAmax for NA.

The function x(NAmax), which is a monotonically increasing function, can have an inverse function NAmax (x). This inverse function NAmax(x) is hereinafter referred to as "NA power cumulative distribution". A value NAmax (x0) of this inverse function NAmax(x) of a particular power cumulative rate x0 is hereinafter referred to as "NA upper limit value corresponding to a power cumulative rate x0".

The technical field of laser machining often uses, as an indicator of the beam quality of output light, an NA upper limit value NAmax(86%) corresponding to a power cumulative rate of 86%. For instance, a fiber laser having a relatively small NAmax(86%) value for output light may be used for cutting a processing target object, whereas a fiber laser having a relatively large NAmax(86%) value for output light may be used for welding a processing target object.

Configuration of Fiber Laser System

Figure 1:
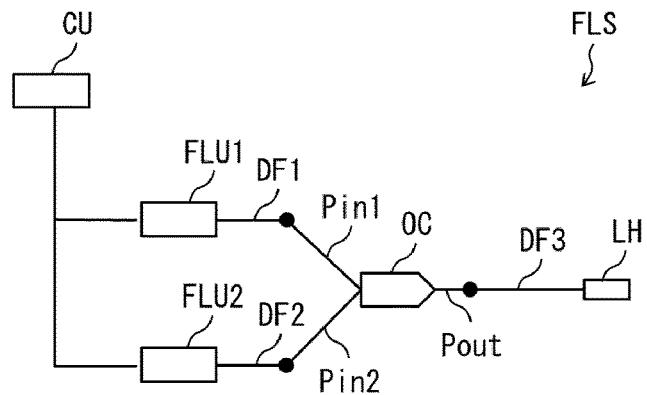
FIG. 1 is a block diagram illustrating the configuration of a fiber laser system in accordance with one or more embodiments of the present invention.

The description below deals with the configuration of a fiber laser system FLS in accordance with one or more embodiments of the present invention with reference to FIG. 1. FIG. 1 is a block diagram illustrating the configuration of a fiber laser system FLS.

The fiber laser system FLS, as illustrated in FIG. 1, includes two fiber laser units FLU1 and FLU2, an output combiner OC, a laser head LH, three delivery fibers DF1 to DF3, and a control unit CU.

Each fiber laser unit FLUi (where i=1, 2) is an element for generating laser light. The fiber laser unit FLUi generates laser light having a variable power Pi controlled by the control unit CU. The fiber laser unit FLUi is connected to an input port Pini of the output combiner OC via a delivery fiber DFi. The laser light generated by the fiber laser unit FLUi is guided through the delivery fiber DFi to be inputted into the output combiner OC. An example configuration of the fiber laser unit FLUi will be described later with reference to another drawing.

The output combiner OC is an element for (i) combining respective laser beams generated by the fiber laser units FLU1 and FLU2 and thereby (ii) producing output light. The output light produced by the output combiner OC includes, as respective laser beams from the fiber laser units FLUi, laser beams different from each other in terms of NA power cumulative distribution. The output combiner OC has an output port Pout connected to the laser head LH via the delivery fiber DF3. The output light produced by the output combiner OC is guided through the delivery fiber DF3 to be inputted into the laser head LH. An example configuration of the output combiner OC will be described later with reference to another drawing.

The laser head LH is an element for preventing output light emitted from the delivery fiber DF3 from entering the delivery fiber DF3 again as a result of being reflected by a processing target object. The laser head LH includes, for example, a glass block and a housing containing the glass block. The output light emitted by the laser head LH strikes the processing target object.

The control unit CU sets the power Pi of laser light from each fiber laser unit FLUi so that the NA upper limit value NAmax(x0) corresponding to a power cumulative rate x0 predetermined for output light is equal to a value specified (for example, by an operator). The control unit CU, for instance, sets the power Pi of laser light from each fiber laser unit FLUi so that the NA upper limit value NAmax(86%) corresponding to a power cumulative rate of 86% for output light is equal to 0.08.

Example Configuration of Fiber Laser Unit

Figure 2:
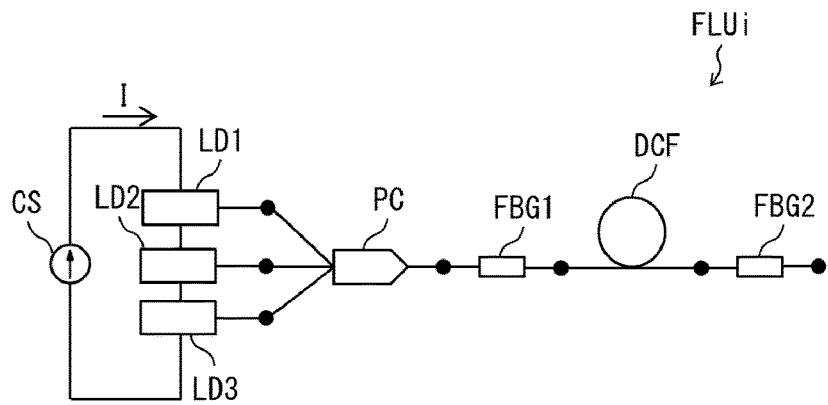
FIG. 2 is a block diagram illustrating the configuration of each fiber laser unit included in the fiber laser system illustrated in FIG. 1.

The description below deals with an example configuration of each fiber laser unit FLUi with reference to FIG. 2. FIG. 2 is a block diagram illustrating an example configuration of each fiber laser unit FLUi.

The fiber laser unit FLUi can, as illustrated in, for example, FIG. 2, include a current source CS, m laser diodes LD1 to LDm, a pump combiner PC, a high-reflectance fiber Bragg grating FBG1, a double cladding fiber DCF, and a low-reflectance fiber Bragg grating FBG2. While FIG. 2 illustrates an example configuration in which m=3, the number m of laser diodes LD1 to LDm may be any number.

Each laser diode LDj is an element for generating a pump beam (j=1, 2, ..., m). Each laser diode LDj is connected to an input port of the pump combiner PC. The pump beam generated by each laser diode LDj is inputted into the pump combiner PC.

The pump combiner PC is an element for (i) combining respective pump beams generated by the laser diodes LD1 to LDm and thereby (ii) producing a combined pump beam. The pump combiner PC has an output port connected to the double cladding fiber DCF via the high-reflectance fiber Bragg grating FBG1. The combined pump beam produced by the pump combiner PC passes through the high-reflectance fiber Bragg grating FBG1 to be inputted into the inner cladding of the double cladding fiber DCF.

The double cladding fiber DCF is an element for converting a pump beam as combined by the pump combiner PC into a laser beam. The double cladding fiber DCF has a core containing a rare earth element such as Yb. The combined pump beam produced by the pump combiner PC is used to maintain the population inversion state of the rare earth element. The double cladding fiber DCF forms a resonator together with the high-reflectance fiber Bragg grating FBG1 connected to the input-side end of the double cladding fiber DCF and the low-reflectance fiber Bragg grating FBG2 connected to the output-side end of the double cladding fiber DCF. In the core of the double cladding fiber DCF, the rare earth element maintained in the population inversion state repeats induced emission. This allows a laser beam to be generated. The double cladding fiber DCF has an output-side end connected to an input port of a laser combiner LC via the low-reflectance fiber Bragg grating FBG2. That portion of the laser beam generated by the double cladding fiber DCF which has passed through the low-reflectance fiber Bragg grating FBG2 is inputted into the delivery fiber DFi connected to the fiber laser unit FLUi (see FIG. 1).

The laser beam generated by the fiber laser unit FLUi has a power Pi that depends on the power of the pump beam supplied by each laser diode LDj to the double cladding fiber DCF. The pump beam supplied by each laser diode LDj to the double cladding fiber DCF has a power that depends on the amount of a driving current I supplied by the current source CS to each laser diode LD. This means that the laser beam generated by the fiber laser unit FLUi has a power Pi that depends on the amount of the driving current I supplied by the current source CS to each laser diode LDj. While the control unit CU functions to cause the fiber laser unit FLUi to generate a laser beam having a power Pi with a certain value, this function is achieved by the control unit CU controlling the current source CS so that the current source CS supplies each laser diode LDj with a driving current I in an amount corresponding to the value.

Example Configuration of Output Combiner

Figure 3:
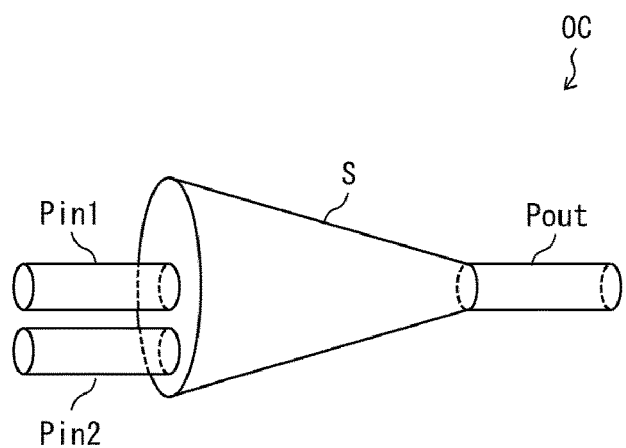
FIG. 3 is a perspective view of the configuration of an output combiner included in the fiber laser system illustrated in FIG. 1.

The description below deals with an example configuration of the output combiner OC with reference to FIG. 3. FIG. 3 is a perspective view of the output combiner OC, illustrating an example configuration thereof.

The output combiner OC can include input ports Pin1 and Pin2, a reducing diameter section S, and an output port Pout as illustrated in, for example, FIG. 3.

The reducing diameter section S is a structure made of quartz glass and having the shape of a circular truncated cone. The reducing diameter section S functions as an air cladding light waveguide. The input ports Pin1 and Pin2 are each an optical fiber having an emission end surface fused with the entrance end surface of the reducing diameter section S (that is, that one of the end surfaces of the reducing diameter section S which has a larger area). The output port Pout is an optical fiber having an entrance end surface fused with the emission end surface of the reducing diameter section S (that is, that one of the end surfaces of the reducing diameter section S which has a smaller area).

The output combiner OC is characterized in that the input port Pin1 has an emission end surface fused with a portion of the entrance end surface of the reducing diameter section S which portion is near the center of the entrance end surface, whereas the input port Pin2 has an emission end surface fused with a portion of the entrance end surface of the reducing diameter section S which portion is near the periphery of the reducing diameter section S.

The respective light beams having entered the reducing diameter section S from the input ports Pin1 and Pin2 each propagate through the reducing diameter section S while increasing NA. The NA value of the light beam having entered the reducing diameter section S from the input port Pin2 increases at a rate higher than the rate at which the NA value of the light beam having entered the reducing diameter section S from the input port Pin1 increases. This is because light propagating near the periphery of the reducing diameter section S (that is, light having entered the reducing diameter section S from the input port Pin2) is subjected to an NA increasing effect by the reducing diameter section S more strongly than light propagating near the center of the reducing diameter section S (that is, light having entered the reducing diameter section S from the input port Pin1).

The fiber laser system FLS is arranged such that the fiber laser unit FLUi generates a laser beam that is inputted into the output combiner OC via the corresponding input port Pini. Thus, even if the respective laser beams generated by the fiber laser units FLU1 and FLU2 share the same NA power cumulative distribution upstream of the output combiner OC, the laser beams do not share the same NA power cumulative distribution downstream of the output combiner OC.

Power Setting Process

As described above, the control unit CU sets the power Pi of laser light from each fiber laser unit FLUi so that the NA upper limit value NAmax(x0) corresponding to a power cumulative rate x0 predetermined for output light is equal to a specified value. In a case where the control unit CU, for instance, sets the power Pi of laser light from each fiber laser unit FLUi so that the NA upper limit value NAmax(86%) corresponding to a power cumulative rate of 86% for output light is equal to a specified value of 0.08, the power setting process includes the steps below to be carried out successively.

Step 1: Specify (i) a power cumulative rate x1 corresponding the specified value of 0.08 for a laser beam from the fiber laser unit FLU1 and (ii) a power cumulative rate x2 corresponding the specified value of 0.08 for a laser beam from the fiber laser unit FLU2. The power cumulative rates x1 and x2 can be specified, for example, with reference to (i) a table that defines the relationship of correspondence between the NA upper limit value NAmax of the laser beam from the fiber laser unit FLU1 and the power cumulative rate x1 and (ii) a table that defines the relationship of correspondence between the NA upper limit value NAmax of the laser beam from the fiber laser unit FLU2 and the power cumulative rate x2.

Step 2: Solve the simultaneous equations below including, as coefficients, the power cumulative rates x1 and x2 specified in step 1. The simultaneous equations below can be solved on the basis of a publicly known numerical solution.

$$\alpha \cdot x1 + \beta \cdot x2 = 86\% \qquad (1)$$

$$\alpha + \beta = 1 \qquad (2)$$

Step 3: Set the power P1 of the laser beam from the fiber laser unit FLU1 and the power P2 of the laser beam from the fiber laser unit FLU2 so that the power ratio P1:P2 is equal to the ratio $\alpha:\beta$, each of $\alpha$ and $\beta$ being a solution obtained in step 2. For instance, in a case where the total power P is predetermined, the power P1 of the laser beam from the fiber laser unit FLU1 is set to $P \times \alpha$, whereas the power P2 of the laser beam from the fiber laser unit FLU2 is set to $P \times \beta$.

Figure 4:
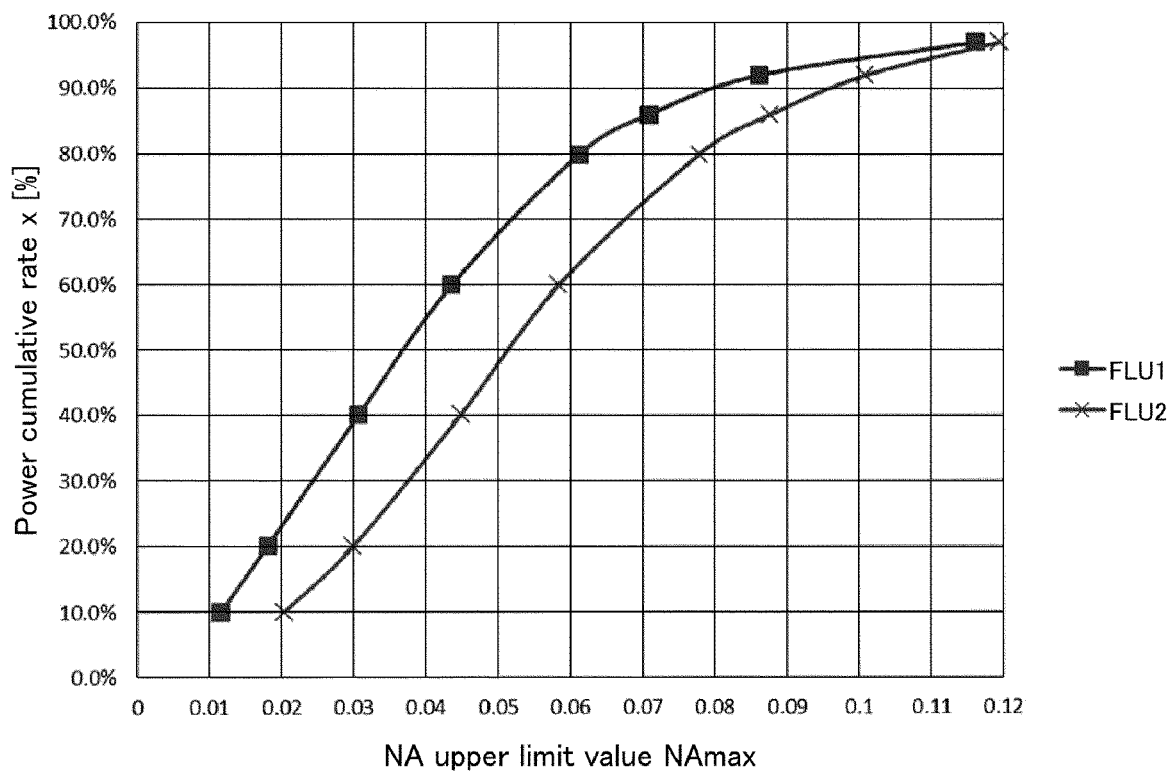
FIG. 4 is a graph that shows an example NA power cumulative distribution of a laser beam from each fiber laser unit included in the fiber laser system illustrated in FIG. 1.

FIG. 4 is a graph that shows an example NA power cumulative distribution of a laser beam from each of the fiber laser units FLU1 and FLU2. The graph shown in FIG. 4 has a vertical axis indicative of the power cumulative rate x and a horizontal axis indicative of the NA upper limit value NAmax.

In a case where the respective laser beams from the fiber laser units FLU1 and FLU2 each have an NA power cumulative distribution as shown in FIG. 4 as an example, step 1 specifies the power cumulative rates x1 and x2 as 89.5% and 81.8%, respectively. Step 2 thus involves solving the simultaneous equations as below.

$$89.5 \cdot \alpha + 81.1 \cdot \beta = 86 \qquad (1)$$

$$\alpha + \beta = 1 \qquad (2)$$

The solutions $\alpha$ and $\beta$ obtained in step 2 are 42.8% and 57.1%, respectively. For instance, in a case where the total power P is set to 1 kW, the laser beam from the fiber laser unit FLU1 is set to have a power P1 of 428 W, and the laser beam from the fiber laser unit FLU2 is set to have a power P1 of 571 W.

Configuration of Fiber Laser System

Figure 5:
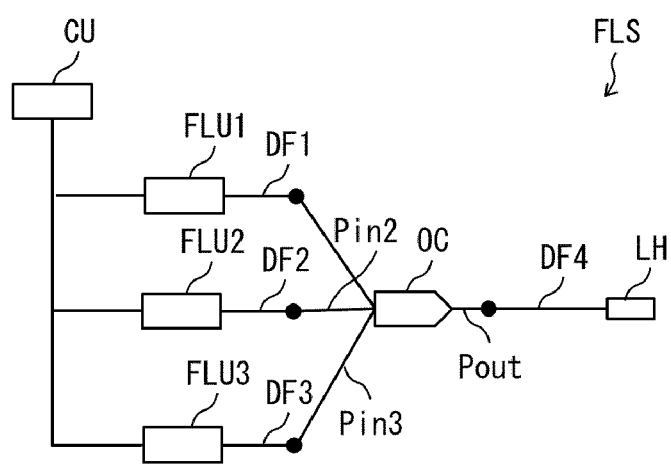
FIG. 5 is a block diagram illustrating the configuration of a fiber laser system in accordance with one or more embodiments of the present invention.

The description below deals with the configuration of a fiber laser system FLS in accordance with one or more embodiments of the present invention with reference to FIG. 5. FIG. 5 is a block diagram illustrating the configuration of a fiber laser system FLS.

The fiber laser system FLS, as illustrated in FIG. 5, includes three fiber laser units FLU1 to FLU3, an output combiner OC, a laser head LH, four delivery fibers DF1 to DF4, and a control unit CU.

Each fiber laser unit FLUi (where i=1, 2, 3) is an element for generating laser light. The fiber laser unit FLUi generates laser light having a variable power Pi controlled by the control unit CU. The fiber laser unit FLUi is connected to an input port Pini of the output combiner OC via a delivery fiber DFi. The laser light generated by the fiber laser unit FLUi is guided through the delivery fiber DFi to be inputted into the output combiner OC. An example configuration of the fiber laser unit FLUi is similar to that for the above-described embodiments.

The output combiner OC is an element for (i) combining respective laser beams generated by the fiber laser units FLU1 to FLU3 and thereby (ii) producing output light. The output light produced by the output combiner OC includes, as respective laser beams from the fiber laser units FLUi, laser beams different from each other in terms of NA power cumulative distribution. The output combiner OC has an output port Pout connected to the laser head LH via the delivery fiber DF4. The output light produced by the output combiner OC is guided through the delivery fiber DF4 to be inputted into the laser head LH. An example configuration of the output combiner OC is similar to that for the above-described embodiments.

The laser head LH is an element for preventing output light emitted from the delivery fiber DF4 from entering the delivery fiber DF4 again as a result of being reflected by a processing target object. The laser head LH includes, for example, a glass block and a housing containing the glass block. The output light emitted by the laser head LH strikes the processing target object.

The control unit CU sets the power Pi of laser light from each fiber laser unit FLUi so that (i) the NA upper limit value NAmax(x01) corresponding to a power cumulative rate x01 predetermined for output light and (ii) the NA upper limit value NAmax(x02) corresponding to a power cumulative rate x02 predetermined for output light are each equal to a specified value. The control unit CU, for instance, sets the power Pi of laser light from each fiber laser unit FLUi so that (i) the NA upper limit value NAmax(86%) corresponding to a power cumulative rate of 86% for output light is equal to 0.08 and that (ii) the NA upper limit value NAmax(50%) corresponding to a power cumulative rate of 50% for output light is equal to 0.04.

Power Setting Process

As described above, the control unit CU sets the power Pi of laser light from each fiber laser unit FLUi so that the NA upper limit values NAmax(x01) and NAmax(x02) corresponding respectively to power cumulative rates x01 and x02 predetermined for output light are each equal to a specified value. In a case where the control unit CU, for instance, sets the power Pi of laser light from each fiber laser unit FLUi so that the NA upper limit values NAmax(86%) and NAmax(50%) corresponding respectively to power cumulative rates of 86% and 50% for output light are equal respectively to specified values of 0.08 and 0.04, the power setting process includes the steps below to be carried out successively.

Step 1: Specify (i) a power cumulative rate x11 corresponding to a specified value of 0.08 for a laser beam from the fiber laser unit FLU1, (ii) a power cumulative rate x12 corresponding to the specified value of 0.08 for a laser beam from the fiber laser unit FLU2, and (iii) a power cumulative rate x13 corresponding to the specified value of 0.08 for a laser beam from the fiber laser unit FLU3. Further, specify (i) a power cumulative rate x21 corresponding to a specified value of 0.04 for a laser beam from the fiber laser unit FLU1, (ii) a power cumulative rate x22 corresponding to the specified value of 0.04 for a laser beam from the fiber laser unit FLU2, and (iii) a power cumulative rate x23 corresponding to the specified value of 0.04 for a laser beam from the fiber laser unit FLU3.

Step 2: Solve the simultaneous equations below including, as coefficients, the power cumulative rates x11, x12, x13, x21, x22, and x23 specified in step 1.

$$\alpha \cdot x11 + \beta \cdot x12 + \gamma \cdot x13 = 86\% \tag{1}$$

$$\alpha \cdot x21 + \beta \cdot x22 + \gamma \cdot x23 = 50\% \tag{2}$$

$$\alpha + \beta + \gamma = 1 \tag{3}$$

Step 3: Set the power P1 of the laser beam from the fiber laser unit FLU1, the power P2 of the laser beam from the fiber laser unit FLU2, and the power P3 of the laser beam from the fiber laser unit FLU3 so that the power ratio P1:P2:P3 is equal to the ratio $\alpha:\beta:\gamma$, each of $\alpha$, $\beta$, and $\gamma$ being a solution obtained in step 2. For instance, in a case where the total power P is predetermined, (i) the power P1 of the laser beam from the fiber laser unit FLU1 is set to P×$\alpha$, (ii) the power P2 of the laser beam from the fiber laser unit FLU2 is set to P×$\beta$, and (iii) the power P3 of the laser beam from the fiber laser unit FLU3 is set to P×$\gamma$.

Figure 6:
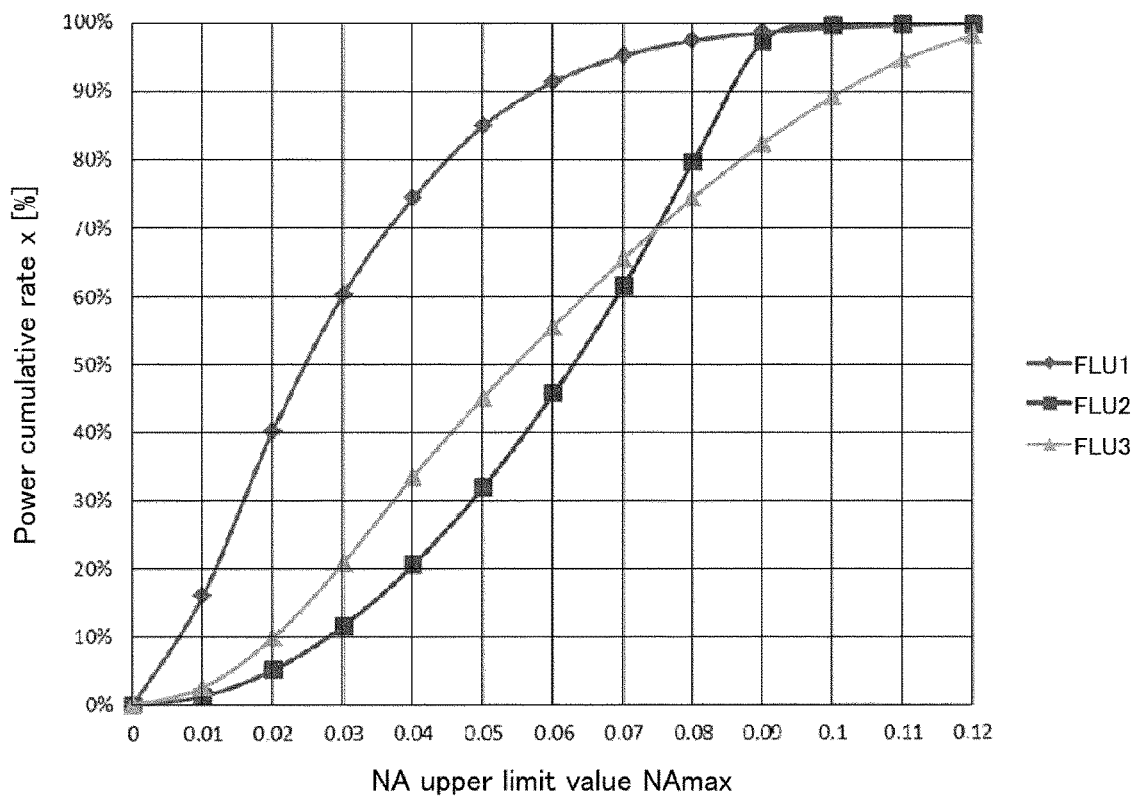
FIG. 6 is a graph that shows an example NA power cumulative distribution of a laser beam from each fiber laser unit included in the fiber laser system illustrated in FIG. 5.

FIG. 6 is a graph that shows an example NA power cumulative distribution of a laser beam from each of the fiber laser units FLU1 to FLU3. The graph shown in FIG. 6 has a vertical axis indicative of the power cumulative rate x and a horizontal axis indicative of the NA upper limit value NAmax.

In a case where the respective laser beams from the fiber laser units FLU1 to FLU3 each have an NA power cumulative distribution as shown in FIG. 6 as an example, (i) step 1 specifies the power cumulative rates x11, x12, and x13 as 97.4%, 79.7%, and 74.5%, respectively. (i) step 1 specifies the power cumulative rates x21, x22, and x23 as 74.5%, 20.6%, and 33.5%, respectively. Step 2 thus involves solving the simultaneous equations as below.

$$97.4 \cdot \alpha + 79.7 \cdot \beta + 74.5 \cdot \gamma = 86 \tag{1}$$

$$74.5 \cdot \alpha + 20.6 \cdot \beta + 33.5 \cdot \gamma = 50 \tag{2}$$

$$\alpha + \beta + \gamma = 1 \tag{3}$$

Variation

The fiber laser system FLS in accordance with the above-described embodiments is arranged to set the power Pi of laser light from each fiber laser unit FLUi so that the upper limit NA values corresponding respectively to two (that is, the number of fiber laser units minus 1) power cumulative rates predetermined for output light are each equal to a specified value. The present invention is, however, not limited to such an arrangement. Specifically, the present invention may alternatively be arranged to set the power Pi of laser light from each fiber laser unit FLUi so that (i) the upper limit NA value corresponding to one (that is, the number of fiber laser units minus 2) power cumulative rate predetermined for output light is equal to a specified value and that (ii) the output light has a beam profile similar to a specified beam profile.

Figure 7:
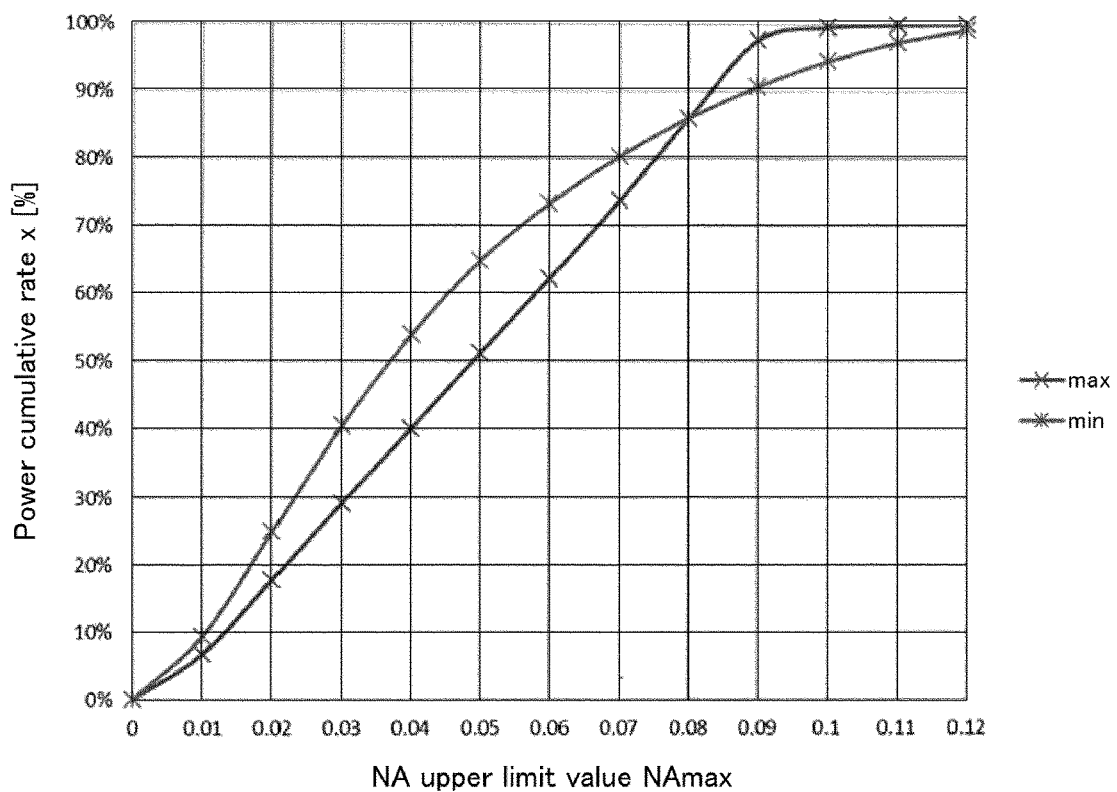
FIG. 7 is a graph that shows (the boundary of) the range of an NA power cumulative distribution that output light from the fiber laser system illustrated in FIG. 5 can have under the condition that the NA upper limit value NAmax (86%) corresponding to a power cumulative rate of 86% is equal to a specified value of 0.08.

FIG. 7 is a graph that shows (the boundary of) the range of an NA power cumulative distribution that output light can have under the condition that the NA upper limit value NAmax(86%) corresponding to a power cumulative rate of 86% for output light is equal to a specified value of 0.08. For instance, the NA upper limit value NAmax(50%) corresponding to a power cumulative rate of 50% for output light can be varied within a range of not less than 0.036 and not more than 0.049.

Figure 8:
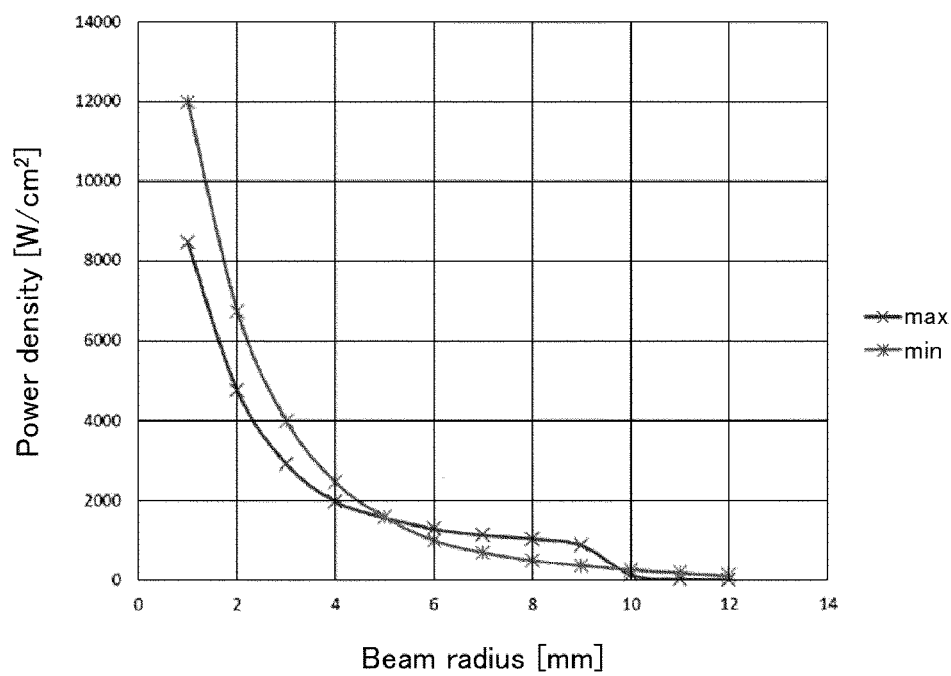
FIG. 8 is a graph that shows (i) a beam profile of output light from the fiber laser system illustrated in FIG. 5 which beam profile is obtained under the condition that the NA upper limit value NAmax(86%) corresponding to a power cumulative rate of 86% is equal to a specified value of 0.08, and the NA upper limit value NAmax(50%) corresponding to a power cumulative rate of 50% is equal to a minimum value of 0.036, and (ii) a beam profile of output light from the fiber laser system illustrated in FIG. 5 which beam profile is obtained under the condition that the NA upper limit value NAmax(86%) corresponding to a power cumulative rate of 86% is equal to a specified value of 0.08, and the NA upper limit value NAmax(50%) corresponding to a power cumulative rate of 50% for output light is equal to a maximum value of 0.049.

FIG. 8 is a graph that shows (i) the beam profile of output light for which the NA upper limit value NAmax(86%) corresponding to a power cumulative rate of 86% for output light is equal to a specified value of 0.08, and the NA upper limit value NAmax(50%) corresponding to a power cumulative rate of 50% for output light is equal to a minimum value of 0.036, and (ii) the beam profile of output light for which the NA upper limit value NAmax(86%) corresponding to a power cumulative rate of 86% for output light is equal to a specified value of 0.08, and the NA upper limit value NAmax(50%) corresponding to a power cumulative rate of 50% for output light is equal to a maximum value of 0.049.

FIG. 8 shows that (1) in a case where the NA upper limit value NAmax(50%) corresponding to a power cumulative rate of 50% for output light is equal to a minimum value of 0.036, the output light has a beam profile that is broad and may be used for welding a processing target object, and (2) in a case where the NA upper limit value NAmax(50%) corresponding to a power cumulative rate of 50% for output light is equal to a maximum value of 0.049, the output light has a beam profile that is sharp and may be used for cutting a processing target object. The present variation may thus be arranged to (1) in a case where an operator, for example, has selected a broad beam profile, set the power ratio P1:P2:P3 so that the NA upper limit value NAmax(50%) corresponding to a power cumulative rate of 50% for output light is a minimum value of 0.036, and (2) in a case where an operator, for example, has selected a sharp beam profile, set the power ratio P1:P2:P3 so that the NA upper limit value NAmax(50%) corresponding to a power cumulative rate of 50% for output light is a maximum value of 0.049.

Aspects of the present invention can also be expressed as follows: The fiber laser system in accordance with one or more of the above embodiments includes: N fiber laser units, where N≥2, configured to generate respective laser beams; an output combiner configured to (i) combine the respective laser beams from the N fiber laser units and (ii) generate output light including, as the respective laser beams from the N fiber laser units, laser beams different from each other in terms of NA power cumulative distribution; and a control unit configured to set a power of each of the respective laser beams from the N fiber laser units so that an upper limit NA corresponding to each of not more than (N−1) predetermined power cumulative rate(s) is equal to a specified value for the output light.

The control method in accordance with one or more of the above embodiments is a method for controlling a fiber laser system including: N fiber laser units, where N≥2, configured to generate respective laser beams; and an output combiner configured to (i) combine the respective laser beams from the N fiber laser units and (ii) generate output light including, as the respective laser beams from the N fiber laser units, laser beams different from each other in terms of NA power cumulative distribution, the method including the step of: setting a power of each of the respective laser beams from the N fiber laser units so that an upper limit NA corresponding to each of not more than (N−1) predetermined power cumulative rate(s) is equal to a specified value for the output light.

The above arrangement provides a fiber laser system capable of, without use of a spatial optical system, changing the upper limit NA corresponding to each of not more than (N−1) power cumulative rate(s) to a specified value for output light. The above arrangement, in other words, provides a fiber laser system capable of changing the NA power cumulative distribution of output light without use of a spatial optical system. The NA of output light is directly proportional to the angle of divergence of the output light. Thus, stated differently, the present invention advantageously provides a fiber laser system capable of changing the power cumulative distribution of the angle of divergence of output light without use of a spatial optical system.

The fiber laser system in accordance with one or more of the above embodiments may be arranged such that the control unit is configured to set the power of each of the respective laser beams from the N fiber laser units so that the upper limit NA corresponding to each of (N−1) predetermined power cumulative rate(s) is equal to the specified value for the output light.

The above arrangement maximizes the number of power cumulative rates for each of which an operator, for example, can specify a corresponding upper limit NA. The above arrangement, in other words, provides a fiber laser system capable of changing the NA power cumulative distribution of output light most finely.

The fiber laser system in accordance with one or more of the above embodiments may be arranged such that the control unit is configured to set the power of each of the respective laser beams from the N fiber laser units so that (i) the upper limit NA corresponding to each of (N−2) predetermined power cumulative rate(s) is equal to the specified value for the output light and that (ii) the output light has a beam profile similar to a specified beam profile.

The above arrangement provides a fiber laser system capable of changing not only the NA power cumulative distribution of output light, but also the beam profile of the output light.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

FLS Fiber laser system
FLUi Fiber laser unit
OC Output combiner
LH Laser head
DFi Delivery fiber
CU Control unit

The invention claimed is:

1. A fiber laser system, comprising:
N fiber laser units that generate respective laser beams, where N≥2;
an output combiner that:
    combines the respective laser beams, and
    generates output light comprising, as the respective laser beams, laser beams different from each other in terms of NA power cumulative distribution; and
a control unit that sets a power of each of the respective laser beams such that an upper limit NA corresponding to each of not more than (N−1) predetermined power cumulative rate(s) is equal to a specified value for the output light.

2. The fiber laser system according to claim 1, wherein the control unit sets the power of each of the respective laser beams such that the upper limit NA corresponding to each of (N−1) predetermined power cumulative rate(s) is equal to the specified value for the output light.

3. The fiber laser system according to claim 1, wherein the control unit sets the power of each of the respective laser beams such that:
    the upper limit NA corresponding to each of (N−2) predetermined power cumulative rate(s) is equal to the specified value for the output light, and
    the output light has a beam profile similar to a specified beam profile.

4. A method for controlling a fiber laser system that comprises: N fiber laser units, where N≥2, that generates respective laser beams; and an output combiner that combines the respective laser beams and that generates output light that comprises, as the respective laser beams, laser beams different from each other in terms of NA power cumulative distribution, the method comprising:
    setting a power of each of the respective laser beams such that an upper limit NA corresponding to each of not more than (N−1) predetermined power cumulative rate(s) is equal to a specified value for the output light.

* * * * *